US012605015B2

(12) United States Patent
Ophardt et al.

(10) Patent No.: US 12,605,015 B2
(45) Date of Patent: Apr. 21, 2026

(54) FLUID DISPENSER WITH FRANGIBLE SEALING ELEMENT

(71) Applicant: OP-Hygiene IP GmbH, Niederbipp (CH)

(72) Inventors: Heiner Ophardt, Arisdorf (CH); Andrew Jones, St. Anns (CA); Tony Shi, Hamilton (CA)

(73) Assignee: Op-Hygiene IP GmbH, Niederbipp (CH)

( * ) Notice: Subject to any disclaimer, the term of this patent is extended or adjusted under 35 U.S.C. 154(b) by 165 days.

(21) Appl. No.: 18/778,076

(22) Filed: Jul. 19, 2024

(65) Prior Publication Data

US 2025/0024999 A1 Jan. 23, 2025

Related U.S. Application Data

(60) Provisional application No. 63/514,947, filed on Jul. 21, 2023.

(51) Int. Cl.
*A47K 5/12* (2006.01)
*B05B 11/10* (2023.01)

(52) U.S. Cl.
CPC .............. *A47K 5/1207* (2013.01); *A47K 5/12* (2013.01); *A47K 5/1211* (2013.01); *B05B 11/1047* (2023.01)

(58) Field of Classification Search
CPC ...... A47K 5/1207; A47K 5/1211; A47K 5/12; B05B 11/1047; B65D 49/12
See application file for complete search history.

(56) References Cited

U.S. PATENT DOCUMENTS

| | | | | |
|---|---|---|---|---|
| 5,373,970 A * | 12/1994 | Ophardt | A47K 5/1207 222/325 |
| 5,836,482 A * | 11/1998 | Ophardt | A47K 5/1202 222/325 |
| 7,303,099 B2 * | 12/2007 | Ophardt | B05B 7/0037 222/321.9 |
| 7,959,037 B2 | 6/2011 | Ophardt et al. | |
| 7,984,825 B2 * | 7/2011 | Ophardt | A47K 5/1217 250/221 |

(Continued)

FOREIGN PATENT DOCUMENTS

| | | |
|---|---|---|
| CA | 2507914 | 11/2006 |
| EP | 3081312 | 10/2016 |

*Primary Examiner* — Frederick C Nicolas
(74) *Attorney, Agent, or Firm* — Thorpe North & Western, LLP

(57) ABSTRACT

A fluid dispenser including a fluid reservoir containing a supply of a fluid, and a fluid pump that is removably attached to the fluid reservoir. The fluid pump has a frangible sealing element and a pump engagement feature. The fluid reservoir has a reservoir engagement feature that is configured to engage with the pump engagement feature on application of a removal force, such that at least some of the removal force is transmitted to the frangible sealing element so as to cause the frangible sealing element to rupture. The fluid pump is configured to be removable from the fluid reservoir once the frangible sealing element has ruptured, without any portion of the fluid pump remaining in contact with the fluid reservoir post-removal. When the frangible sealing element is ruptured, the fluid pump inoperable.

20 Claims, 9 Drawing Sheets

(56) References Cited

U.S. PATENT DOCUMENTS

| | | | | |
|---|---|---|---|---|
| 8,113,388 | B2 * | 2/2012 | Ophardt | G01F 11/025 222/325 |
| 8,272,539 | B2 * | 9/2012 | Ophardt | A47K 5/1207 417/259 |
| 8,622,243 | B2 | 1/2014 | Ophardt et al. | |
| 8,733,596 | B2 * | 5/2014 | Ophardt | A47K 5/1211 222/145.5 |
| 9,573,152 | B2 * | 2/2017 | Ophardt | A47K 5/14 |
| 9,682,390 | B2 * | 6/2017 | Ophardt | A47K 5/12 |
| 10,105,018 | B2 * | 10/2018 | Jones | B05B 11/0044 |
| 11,453,021 | B2 | 9/2022 | McDonagh et al. | |
| 2023/0149964 | A1 | 5/2023 | McNulty et al. | |

* cited by examiner

FLUID DISPENSER WITH FRANGIBLE SEALING ELEMENT

RELATED APPLICATION

This application claims priority to the 21 Jul. 2023 filing date of U.S. Provisional Patent Application Ser. No. 63/514,947, which is incorporated herein by reference.

FIELD OF THE INVENTION

This invention relates to fluid dispensers, and more particularly to a fluid dispenser with a frangible element that prevents the fluid dispenser from being refilled and reused.

BACKGROUND OF THE INVENTION

Various fluid dispensers are known with pump assemblies that are intended to be replaced regularly, to help prevent contamination. However, such previously known devices suffer the disadvantage that users may choose to reuse the same pump assembly in spite of the manufacturer's instructions to the contrary, and thereby increase the risk of contamination.

To reduce the risk of contamination, it is known to provide pump assemblies in which the fluid reservoir and the fluid pump are configured to be non-removable from each other, thus preventing the fluid reservoir from being refilled.

It is also known to provide pump assemblies with frangible features that are designed to fail when the fluid reservoir and the fluid pump are separated, so as to prevent reuse. For example, European Patent No. EP3081312 to Ophardt, granted Mar. 17, 2021, which is incorporated herein by reference, discloses a fluid pump with a frangible region that is configured to fracture when the pump is pulled axially away from the fluid reservoir, leaving a portion of the pump trapped within the reservoir and rendering the pump non-functional.

The inventors have appreciated a disadvantage of the prior art is that, when all or part of the fluid pump remains connected to or trapped within the fluid reservoir, the fluid reservoir is not easily recyclable. This is because the fluid reservoir and the fluid pump are often made from different materials, which need to be separated prior to recycling.

SUMMARY OF THE INVENTION

To at least partially overcome some of the disadvantages of previously known systems, devices and methods, in one aspect the present invention provides a fluid dispenser including a fluid reservoir containing a supply of a fluid, and a fluid pump that is removably attached to the fluid reservoir. The fluid pump is operable on activation to dispense an allotment of the fluid from the fluid reservoir, and has a frangible sealing element and a pump engagement feature. The fluid reservoir has a reservoir engagement feature that is configured to engage with the pump engagement feature on application of a removal force, such that at least some of the removal force is transmitted to the frangible sealing element so as to cause the frangible sealing element to rupture. The fluid pump is configured to be removable from the fluid reservoir once the frangible sealing element has ruptured, without any portion of the fluid pump remaining in contact with the fluid reservoir post-removal. Preferably, when the frangible sealing element is intact, the frangible sealing element forms at least part of a fluid tight seal that is required for operation of the fluid pump, and when the frangible sealing element is ruptured, the fluid pump is unable to form the fluid tight seal, which renders the fluid pump inoperable.

The inventors have appreciated that the fluid dispenser in accordance with the invention not only prevents reuse of the fluid reservoir and fluid pump, thereby reducing the risk of contamination, but also provides for easy recycling by allowing the fluid reservoir and the fluid pump to be completely separated, without any portion of the fluid pump remaining in contact with the fluid reservoir post-removal.

Further aspects of the invention include:

A fluid dispenser, which optionally incorporates one or more features of any one or more of the preceding and/or following aspects, comprising: a fluid reservoir containing a supply of a fluid; and a fluid pump that is attached to the fluid reservoir; wherein the fluid pump is operable on activation to dispense an allotment of the fluid from the fluid reservoir; wherein the fluid pump comprises a frangible sealing element that forms at least part of at least one fluid tight seal; wherein the fluid pump further comprises a pump engagement feature, and the fluid reservoir comprises a reservoir engagement feature; wherein the pump engagement feature is configured to engage with the reservoir engagement feature upon application of a removal force; wherein, while the pump engagement feature is engaged with the reservoir engagement feature, the frangible sealing element is configured to rupture from the application of the removal force; wherein the pump engagement feature is configured to disengage from the reservoir engagement feature once the frangible sealing element has ruptured; wherein the fluid pump is configured to be removable from the fluid reservoir once the frangible sealing element has ruptured and the pump engagement feature has disengaged from the reservoir engagement feature, without any portion of the fluid pump remaining in contact with the fluid reservoir post-removal; and wherein, when the frangible sealing element is ruptured, the fluid pump is unable to form the at least one fluid tight seal, which renders the fluid pump inoperable.

A fluid dispenser, which optionally incorporates one or more features of any one or more of the preceding and/or following aspects, wherein the pump engagement feature is supported at least in part by the frangible sealing element; and wherein the frangible sealing element is configured so that, once the frangible sealing element is ruptured, the pump engagement feature has an increased freedom of motion that allows the pump engagement feature to disengage from the reservoir engagement feature.

A fluid dispenser, which optionally incorporates one or more features of any one or more of the preceding and/or following aspects, wherein the frangible sealing element is configured to remain connected to at least one component of the fluid pump after the frangible sealing element is ruptured.

A fluid dispenser, which optionally incorporates one or more features of any one or more of the preceding and/or following aspects, wherein the fluid reservoir has a threaded reservoir surface; wherein the fluid pump has a threaded pump surface; wherein, when the fluid pump is attached to the fluid reservoir, the threaded reservoir surface is threadedly engaged with the threaded pump surface; and wherein the fluid pump is configured to be removable from the fluid reservoir by applying the removal force as torque rotating the fluid pump in a loosening direction relative to the fluid reservoir.

A fluid dispenser, which optionally incorporates one or more features of any one or more of the preceding and/or following aspects, wherein the fluid reservoir has a cylindrical neck portion with an inner neck surface and an outer neck surface; wherein the outer neck surface comprises the threaded reservoir surface; wherein the inner neck surface supports the reservoir engagement feature; wherein the fluid pump has a cylindrical reservoir engagement wall; and wherein the cylindrical reservoir engagement wall supports the pump engagement feature.

A fluid dispenser, which optionally incorporates one or more features of any one or more of the preceding and/or following aspects, wherein the reservoir engagement feature comprises at least one rib that extends radially inwardly from the inner neck surface; and wherein the pump engagement feature comprises at least one tooth that extends radially outwardly from the cylindrical reservoir engagement wall.

A fluid dispenser, which optionally incorporates one or more features of any one or more of the preceding and/or following aspects, wherein the at least one tooth has a locking surface that faces in the loosening direction and a sloped surface that faces in a tightening direction; wherein the sloped surface extends laterally outwardly from the cylindrical reservoir engagement wall at a first slope that is selected so that, when the fluid pump is rotated in the tightening direction relative to the fluid reservoir, the at least one rib is able to slide over the sloped surface and move past the at least one tooth without locking in engagement with the at least one tooth; and wherein the locking surface extends laterally outwardly from the cylindrical reservoir engagement wall at a second slope that is selected so that, when the fluid pump is rotated in the loosening direction relative to the fluid reservoir, the at least one rib is unable to slide over the locking surface and becomes locked in engagement with the at least one tooth until the frangible sealing element is ruptured.

A fluid dispenser, which optionally incorporates one or more features of any one or more of the preceding and/or following aspects, wherein a portion of the cylindrical reservoir engagement wall is formed by the frangible sealing element; wherein the frangible sealing element comprises a supporting portion and at least one frangible connecting portion; wherein the supporting portion supports the pump engagement feature; and wherein the at least one frangible connecting portion has a reduced wall thickness that is selected so that at least part of the at least one frangible connecting portion will rupture under the removal force.

A fluid dispenser, which optionally incorporates one or more features of any one or more of the preceding and/or following aspects, wherein the supporting portion is configured to be moveable laterally inwardly away from the reservoir engagement feature once the frangible sealing element has ruptured.

A fluid dispenser, which optionally incorporates one or more features of any one or more of the preceding and/or following aspects, the cylindrical reservoir engagement wall has a sealing portion and a locking portion; wherein the locking portion of the cylindrical reservoir engagement wall is formed by the supporting portion of the frangible sealing element; wherein the pump engagement feature is located on the locking portion; and wherein the reservoir engagement feature is positioned so that, when the fluid pump is connected to the fluid reservoir, the reservoir engagement feature is spaced from the sealing portion.

A fluid dispenser, which optionally incorporates one or more features of any one or more of the preceding and/or following aspects, wherein the at least one frangible connecting portion comprises a leading edge connecting portion that forms part of the cylindrical reservoir engagement wall and is located adjacent to the supporting portion in the loosening direction.

A fluid dispenser, which optionally incorporates one or more features of any one or more of the preceding and/or following aspects, wherein the at least one frangible connecting portion comprises a trailing edge connecting portion that forms part of the cylindrical reservoir engagement wall and is located adjacent to the supporting portion in the tightening direction.

A fluid dispenser, which optionally incorporates one or more features of any one or more of the preceding and/or following aspects, wherein the at least one fluid tight seal comprises a radial seal that is formed between the inner neck surface of the cylindrical neck portion and the cylindrical reservoir engagement wall.

A fluid dispenser, which optionally incorporates one or more features of any one or more of the preceding and/or following aspects, wherein the fluid pump has a transverse annular wall that extends radially inwardly from the threaded pump surface; wherein the cylindrical reservoir engagement wall extends from the transverse annular wall; and wherein part of the transverse annular wall is formed by the frangible sealing element.

A fluid dispenser, which optionally incorporates one or more features of any one or more of the preceding and/or following aspects, wherein, when the fluid pump is connected to the fluid reservoir, the cylindrical neck portion of the fluid reservoir engages with the transverse annular wall; and wherein the at least one fluid tight seal comprises an axial seal that is formed between the cylindrical neck portion and the transverse annular wall.

A fluid dispenser, which optionally incorporates one or more features of any one or more of the preceding and/or following aspects, wherein the fluid pump further comprises: an air vent that extends through the transverse annular wall; and an air valve that engages with the transverse annular wall to regulate air flow through the air vent; wherein the at least one fluid tight seal comprises a valve seal that is formed between the air valve and the transverse annular wall.

A fluid dispenser, which optionally incorporates one or more features of any one or more of the preceding and/or following aspects, wherein the at least one frangible connecting portion comprises an outer connecting portion that forms part of the transverse annular wall and is located radially outwardly from the cylindrical reservoir engagement wall.

A fluid dispenser, which optionally incorporates one or more features of any one or more of the preceding and/or following aspects, wherein the at least one frangible connecting portion comprises an inner connecting portion that forms part of the transverse annular wall and is located radially inwardly from the cylindrical reservoir engagement wall.

A method, which optionally incorporates one or more features of any one or more of the preceding and/or following aspects, comprising: connecting a fluid pump to a fluid reservoir; using the fluid pump to dispense fluid from the fluid reservoir; applying a removal force to the fluid pump, the removal force causing a pump engagement feature of the fluid pump to engage with a reservoir engagement feature of the fluid reservoir; continuing to apply the removal force until a frangible sealing element of the fluid pump ruptures, allowing the pump engagement feature to disengage from the reservoir engagement feature; and removing the fluid pump from the fluid reservoir once the frangible sealing element has ruptured and the pump engagement feature has disengaged from the reservoir engagement feature, without any portion of the fluid pump remaining in contact with the fluid reservoir post-removal; wherein, once the frangible sealing element has ruptured, the fluid pump is unable to form at least one fluid tight seal, which renders the fluid pump inoperable.

A method, which optionally incorporates one or more features of any one or more of the preceding and/or following aspects, wherein the fluid pump and the fluid reservoir form a fluid dispenser when connected; and wherein the fluid dispenser comprises the fluid dispenser in accordance with any one or more of the preceding aspects.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
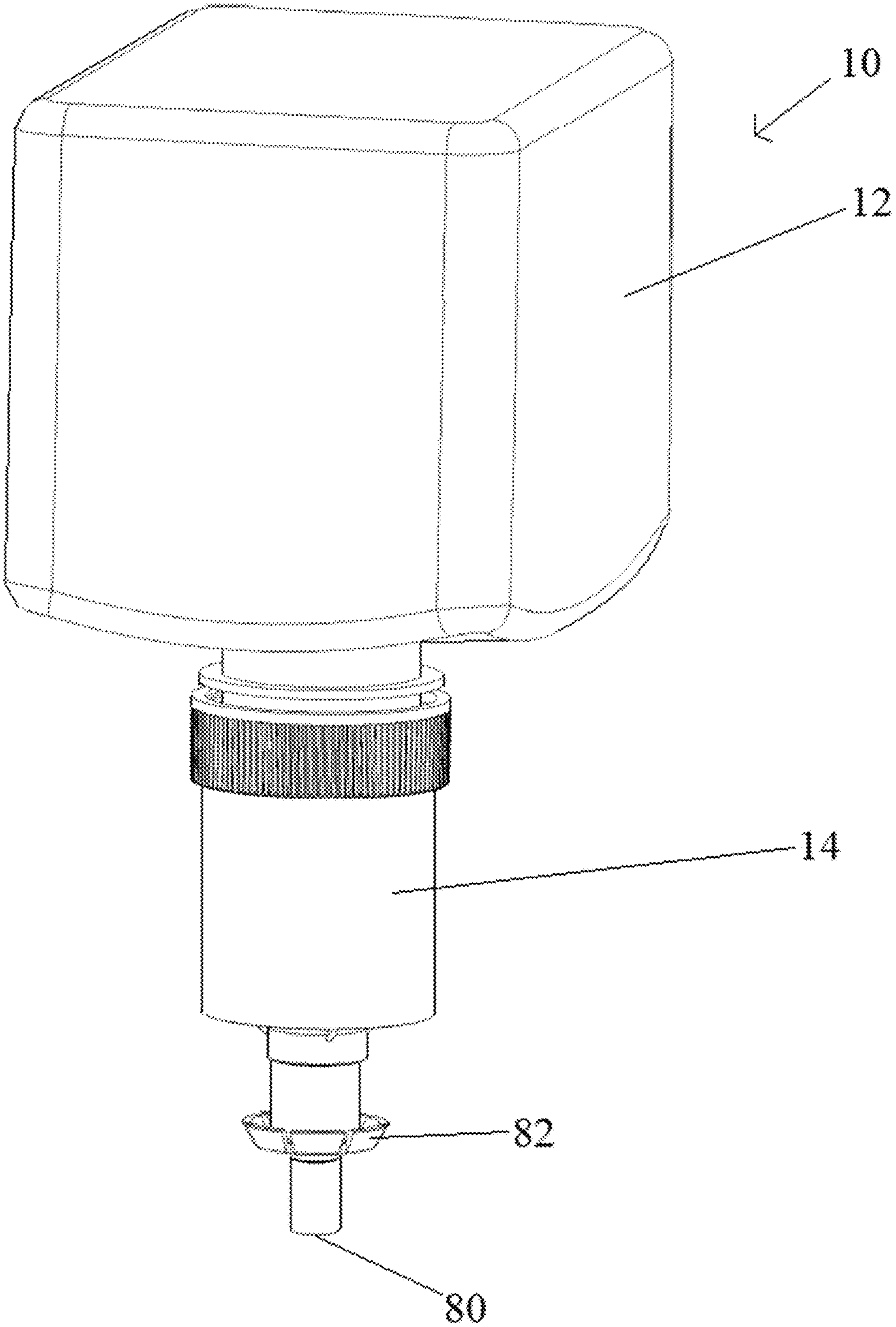
FIG. 1 is a perspective view of a hand cleaning fluid dispenser in accordance with an embodiment of the present invention.

FIG. 1 shows a fluid dispenser 10 in accordance with a preferred embodiment of the present invention. The fluid dispenser 10 has a fluid reservoir 12 that contains a supply of fluid to be dispensed from the fluid dispenser 10, and a fluid pump 14 that is operable on activation to dispense an allotment of the fluid from the fluid reservoir 12.

The fluid dispenser 10 is configured to be received by a housing, not shown, which has an actuation mechanism that can activate the fluid pump 14 so as to dispense fluid from the dispenser 10. Any suitable housing structure could be used, such as the housing disclosed in U.S. Pat. No. 7,959,037 to Ophardt et al, issued Jun. 14, 2011, which is incorporated herein by reference.

Figure 2:
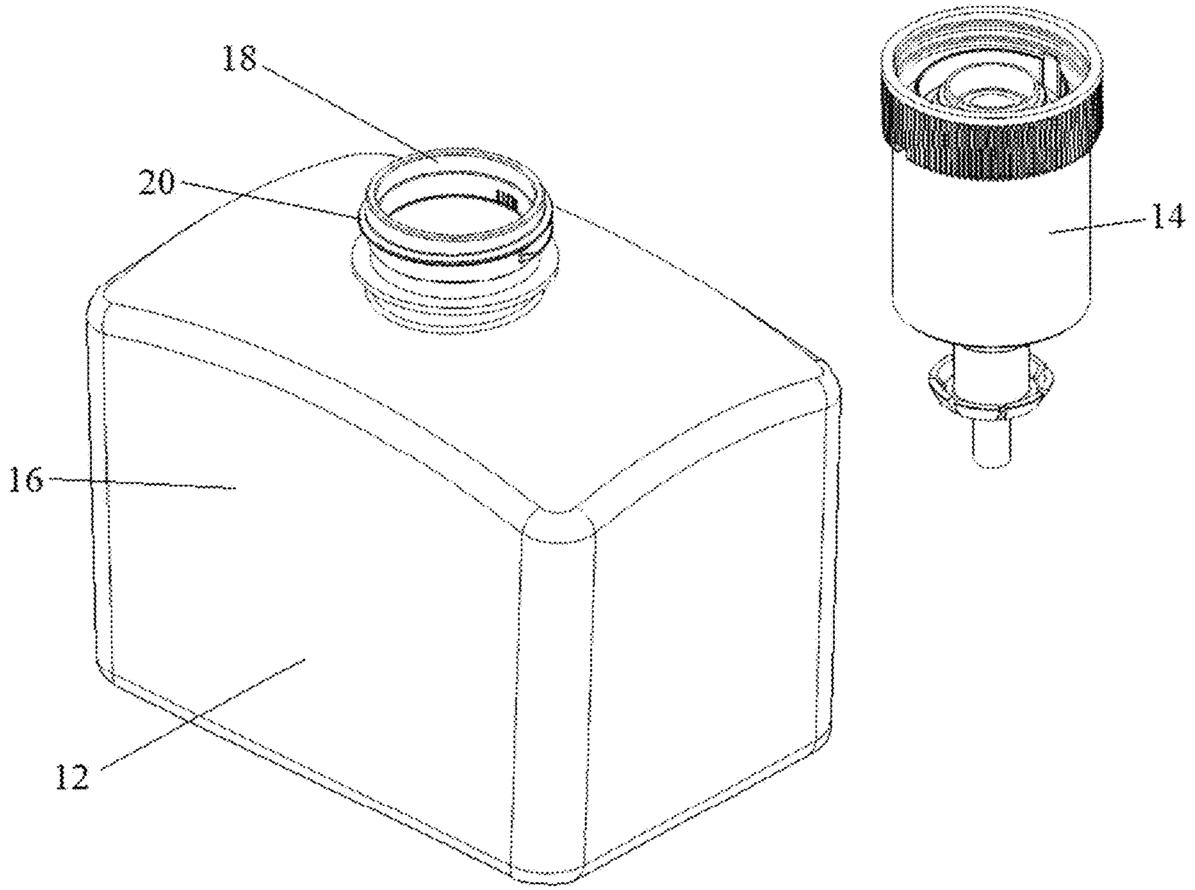
FIG. 2 is a perspective view of a fluid reservoir and a fluid pump of the hand cleaning fluid dispenser shown in FIG. 1.

As can be seen in FIG. 2, the fluid reservoir 12 has a body portion 16 that stores the fluid, and a neck portion 18 that extends from the body portion 16 for engagement with the fluid pump 14. The neck portion 18 has a threaded outer surface 20 for forming a threaded engagement with the fluid pump 14, and an inner surface 22 that defines a neck conduit 24 for delivering fluid from the body portion 16 to the fluid pump 14.

Figure 3:
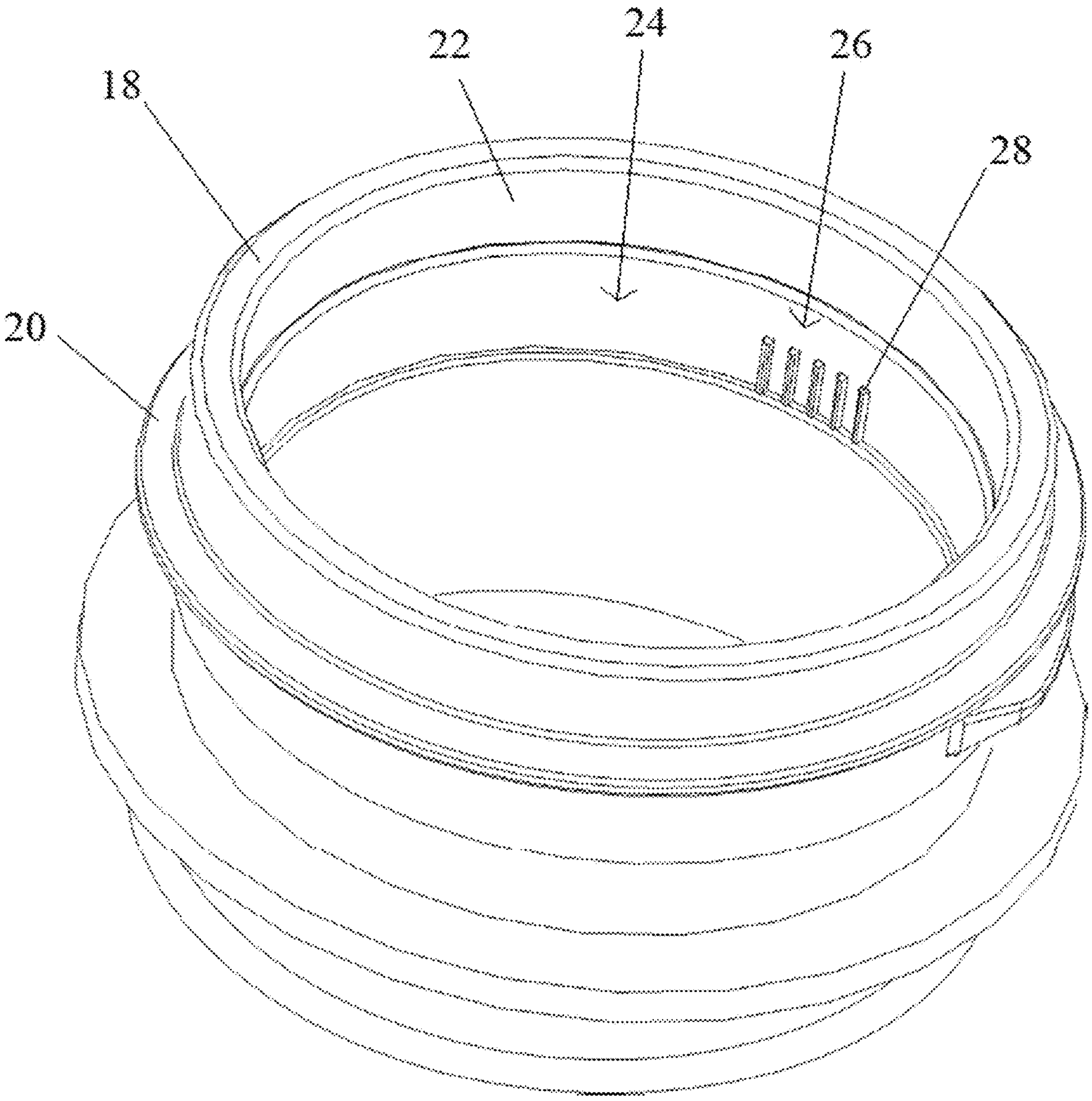
FIG. 3 is a detailed perspective view of a neck portion of the fluid reservoir shown in FIG. 2.

As can be seen in FIG. 3, the inner surface 22 carries a reservoir engagement feature 26. In the preferred embodiment shown, the reservoir engagement feature 26 comprises five vertically oriented ribs 28 that are spaced horizontally from each other and extend radially inwardly from the inner surface 22.

Figure 5:
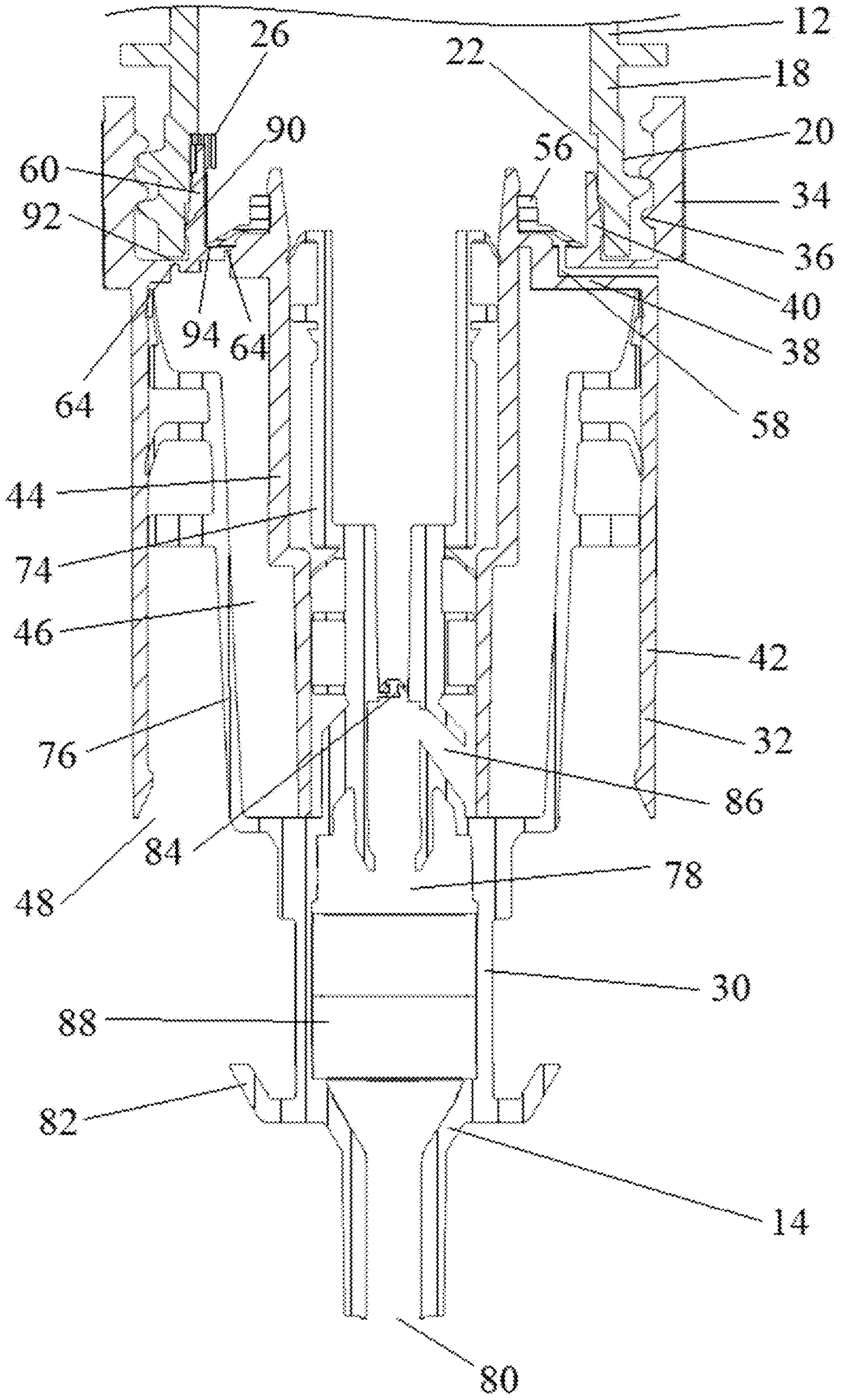
FIG. 5 is a cross-sectional front view of the fluid dispenser shown in FIG. 1, with the fluid pump shown in a retracted position.

As can be seen in FIG. 5, the fluid pump 14 has a piston element 30 and a piston chamber forming body 32. The piston element 30 is vertically slideable relative to the piston chamber forming body 32 between the retracted position shown in FIG. 5, and the extended position shown in FIG. 6.

As can be seen in FIG. 5, the piston chamber forming body 32 has an outer reservoir engagement wall 34 that has a threaded inner surface 36 for threadedly engaging with the threaded outer surface 20 of the neck portion 18 of the fluid reservoir 12. A transverse annular wall 38 extends radially inwardly from the bottom of the outer reservoir engagement wall 34. An inner reservoir engagement wall 40 extends upwardly from the transverse annular wall 38 for engagement with the inner surface 22 of the neck portion 18 of the fluid reservoir 12. An air chamber forming wall 42 extends downwardly from the radially outer end of the transverse annular wall 38, and a liquid chamber forming wall 44 extends downwardly from the radially inner end of the transverse annular wall 38.

The piston chamber forming body 32 defines an air chamber 46 between the inside surface of the air chamber forming wall 42, the bottom surface of the transverse annular wall 38, and the outside surface of the liquid chamber forming wall 44, the air chamber 46 having an air chamber opening 48 at its lower end. The inside surface of the liquid chamber forming wall 44 defines a liquid chamber 50 having an upper liquid chamber opening 52 at its upper end, and a lower liquid chamber opening 54 at its lower end.

As can be seen in FIG. 5, an annular air valve 56 is positioned above the transverse annular wall 38 between the inner reservoir engagement wall 40 and the liquid chamber forming wall 44. An air vent 58 extends through the transverse annular wall 38, the air vent 58 placing the bottom of the air valve 56 in fluid communication with the external atmosphere.

Figure 4:
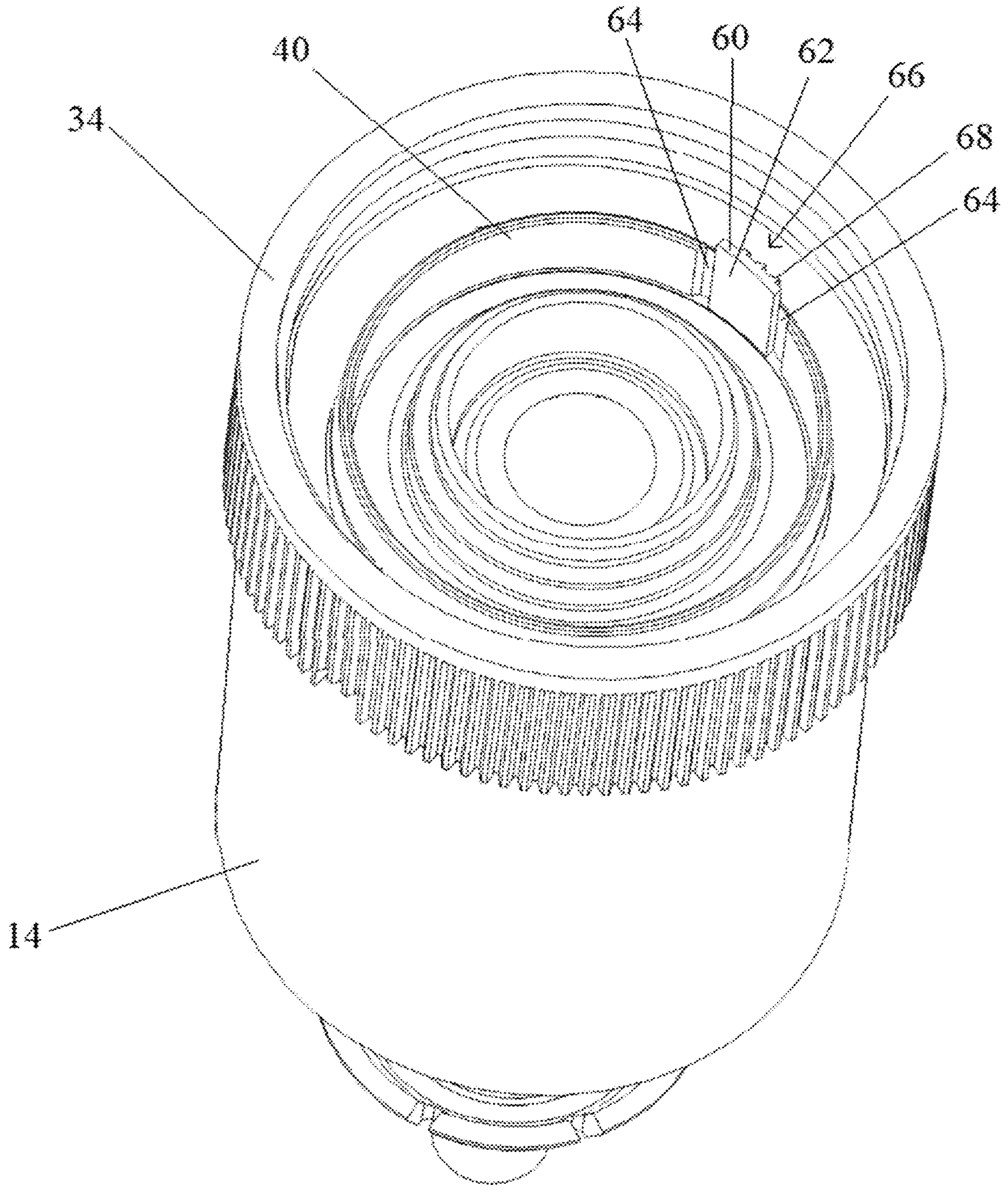
FIG. 4 is a perspective view of the fluid pump shown in FIG. 2.

As can be seen in FIG. 4, the piston chamber forming body 32 has a frangible sealing element 60 that forms part of the inner reservoir engagement wall 40. The frangible sealing element 60 includes a central tab 62 that is connected to the rest of the inner reservoir engagement wall 40 by frangible connecting portions 64. The frangible connecting portions 64 are thinner than the rest of the inner reservoir engagement wall 40, and are configured to rupture when a sufficient force is applied thereto.

Figure 7:
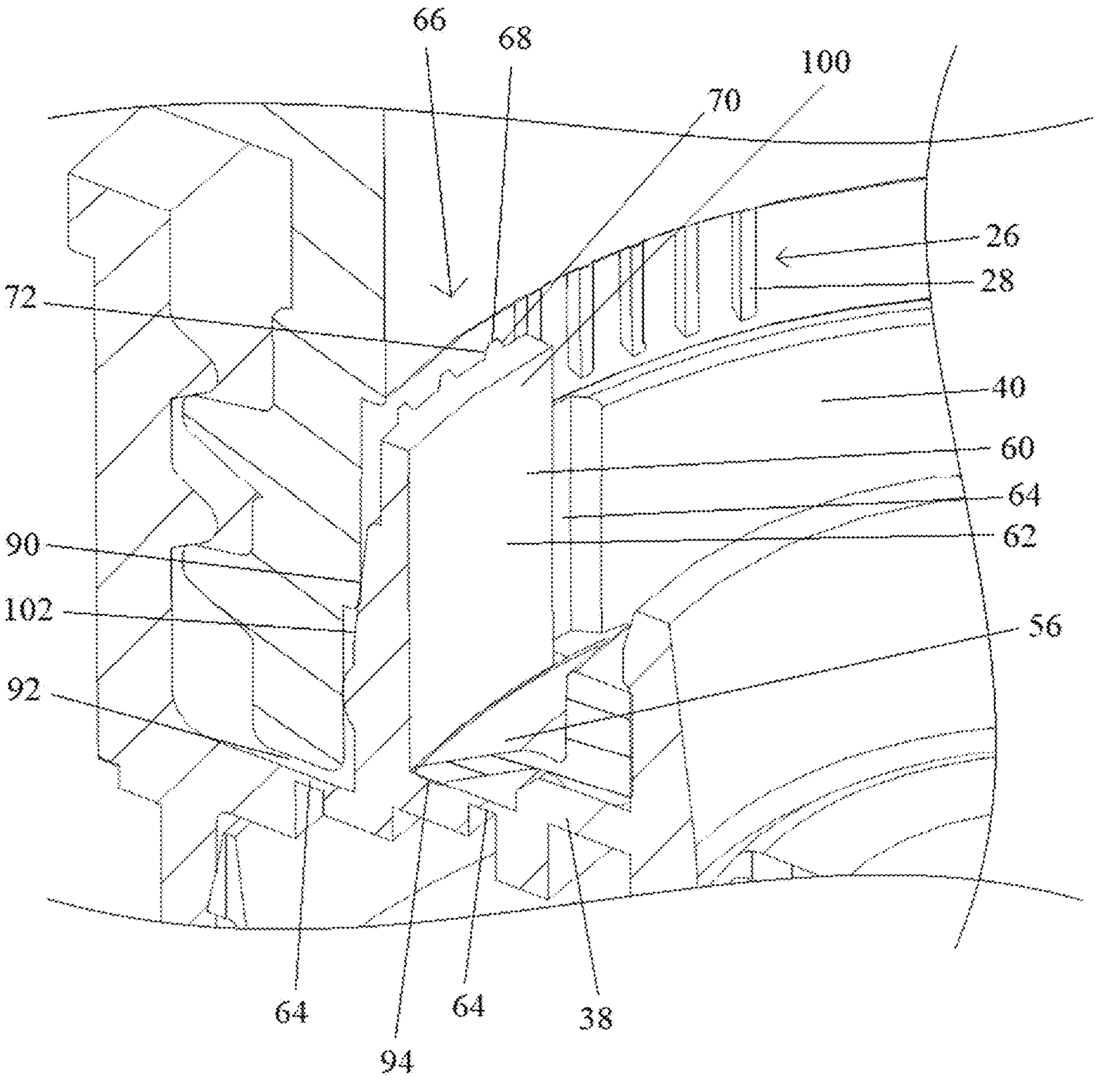
FIG. 7 is a detailed cross-sectional perspective view showing an intact frangible element of the fluid dispenser shown in FIG. 1.

As is best shown in FIG. 7, the central tab 62 carries a pump engagement feature 66. In the preferred embodiment shown, the pump engagement feature 66 is in the form of three teeth 68 that extend radially outwardly from the central tab 62. The teeth 68 each have a locking surface 70 that extends in a substantially perpendicular direction laterally outwardly from the central tab 62, and a sloped surface 72 that extends outwardly from the central tab 62 at a more moderate slope in comparison to the locking surface 70. The sloped surface 72 faces in a tightening direction of the threaded inner surface 36, and the locking surface 70 faces in a loosening direction of the threaded inner surface 36.

As can be seen in FIG. 7, the frangible sealing element 60 also forms part of the transverse annular wall 38, and has frangible connecting portions 64 that connect the frangible sealing element 60 to the rest of transverse annular wall 38.

These frangible connecting portions 64 are thinner than the adjacent portions of the transverse annular wall 38, and are configured to rupture when a sufficient force is applied thereto.

As can be seen in FIG. 7, the central tab 62 has a locking portion 100 that extends upwards further than the rest of the inner reservoir engagement wall 40. The teeth 68 are located on the locking portion 100. The portion of the inner reservoir engagement wall 40 below the locking portion 100 is referred to herein as the sealing portion 102.

Figure 6:
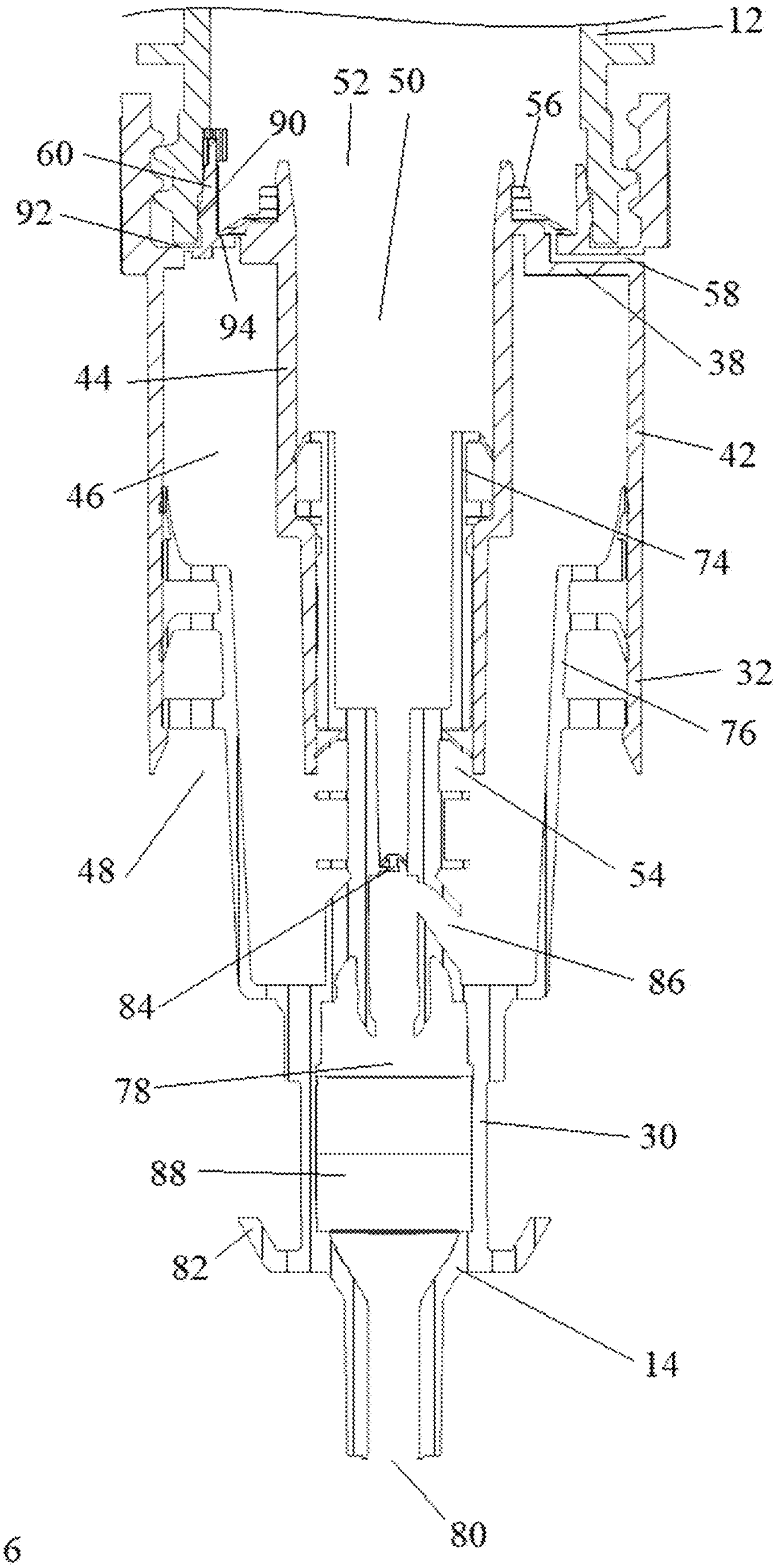
FIG. 6 is a cross-sectional front view of the fluid dispenser shown in FIG. 1, with the fluid pump shown in an extended position.

As can be seen in FIG. 6, the piston element 30 has a liquid piston body 74, an air piston body 76, a foam generating chamber 78, a fluid outlet 80, and a housing engagement body 82. The liquid piston body 74 is slideably received within the liquid chamber 50, and the air piston body 76 is slideably received within the air chamber 46. The liquid piston body 74 carries a one-way fluid valve 84, which permits fluid to travel from the liquid chamber 50 into the foam generating chamber 78, and prevents fluid from travelling from the foam generating chamber 78 into the liquid chamber 50. An open air passage 86 connects the air chamber 46 to the foam generating chamber 78.

The foam generating chamber 78 carries a foam generating assembly 88, which is designed to turbulently mix liquid received from the liquid chamber 50 and air received from the air chamber 46 to generate a foam. The foam generating assembly 88 may have any suitable structure, including one or more mesh layers and one or more porous sponge plugs, as is known in the art.

The fluid outlet 80 is located below the foam generating chamber 78 for dispensing the foam from the fluid pump 14. The housing engagement body 82 extends outwardly near the fluid outlet 80, and is configured to engage with an actuation mechanism of the fluid dispenser housing, as is known in the art.

The operation of the fluid dispenser 10 will now be described with reference to the Figures. Preferably, the fluid dispenser 10 is sold in a preassembled state, with the fluid reservoir 12 filled with a foamable hand cleaning liquid, such as soap or hand sanitizer, and with the fluid pump 14 connected to the neck portion 18 of the fluid reservoir 12.

Referring to FIG. 7, when the fluid pump 14 is being connected to the fluid reservoir 12, the fluid pump 14 is rotated relative to the fluid reservoir 12 in the tightening direction. As the threaded connection is tightened, the teeth 68 on the frangible sealing element 60 move past the ribs 28 on the inner surface 22 of the neck portion 18. The moderate slope of the sloped surfaces 72 allows the teeth 68 to move past the ribs 28 without becoming stuck.

Once the threaded connection is fully tightened, a number of fluid tight seals are formed between the fluid pump 14 and the fluid reservoir 12. For example, a first seal 90 is formed between the inner surface 22 of the neck portion 18 and the outer surface of the inner reservoir engagement wall 40. As can be seen in FIG. 7, the ribs 28 are spaced from the sealing portion 102 of the inner reservoir engagement wall 40, such that the ribs 28 do not interfere with the formation of the first seal 90.

A second seal 92 is furthermore formed between the terminal end of the neck portion 18 and the transverse annular wall 38. As can be seen in FIG. 7, the frangible sealing element 60 forms part of both the first seal 90 and the second seal 92. The first seal 90 and the second seal 92 prevent the liquid held within the fluid reservoir 12 from leaking out through the threaded connection, and leaking into the air chamber 46.

A third seal 94 is also formed between the air valve 56 and the transverse annular wall 38. The third seal 94 prevents the liquid from leaking out of the air vent 58, and also prevents the liquid from leaking into the air chamber 46. As can be seen in FIG. 7, the frangible sealing element 60 also forms part of the third seal 94.

To operate the fluid dispenser 10, the fluid dispenser 10 is placed within a fluid dispenser housing, not shown, so that an actuation mechanism of the housing is in engagement with the housing engagement body 82 of the fluid pump 14. On activation of the actuation mechanism, the piston element 30 is moved relative to the piston chamber forming body 32 between the retracted position shown in FIG. 5 and the extended position shown in FIG. 6.

When the piston element 30 is in the extended position shown in FIG. 6, the liquid chamber 50 is filled with liquid from the fluid reservoir 12, and the air chamber 46 is filled with air. As the piston element 30 moves from the extended position shown in FIG. 6 towards the retracted position shown in FIG. 5, the volume of the liquid chamber 50 decreases, which increases the pressure of the liquid and forces some of the liquid to flow past the one-way fluid valve 84 into the foam generating chamber 78. At the same time, the volume of the air chamber 46 decreases, which forces some of the air contained within the air chamber 46 to flow through the open air passage 86 and into the foam generating chamber 78.

As the liquid and the air move through the foam generating assembly 88, the liquid and air are turbulently mixed, so as to form a foam. The foam is then discharged from the fluid pump 14 out the fluid outlet 80.

When the piston element 30 moves from the retracted position shown in FIG. 5 to the extended position shown in FIG. 6, the volume of the liquid chamber 50 increases. This lowers the pressure within the liquid chamber 50, as well as the pressure within the fluid reservoir 12, drawing air into the fluid reservoir 12 via the air vent 58 past the air valve 56. The liquid remaining in the fluid reservoir 12 gathers at the bottom of the fluid reservoir 12 and in the liquid chamber 50 under the force of gravity, and the drawn in air collects at the top of the fluid reservoir 12.

At the same time, the volume of the air chamber 46 increases. This lowers the pressure within the air chamber 46, and causes air to be drawn into the air chamber 46 via the fluid outlet 80, the foam generating chamber 78, and the open air passage 86. Once the piston element 30 reaches the extended position shown in FIG. 6, the liquid chamber 50 is filled with liquid and the air chamber 46 is filled with air, and the fluid pump 14 is ready to dispense another allotment of foam.

To reduce the risk of contamination, the fluid dispenser 10 is designed to be replaced with a new fluid dispenser 10 once the fluid reservoir 12 is empty. In order to more easily recycle the fluid dispenser 10, the fluid pump 14 can be removed from the fluid reservoir 12.

To remove the fluid pump 14, the fluid pump 14 is rotated in the loosening direction relative to the fluid reservoir 12. This is done by applying a removal force to the fluid pump 14, for example by holding the fluid reservoir 12 with one hand and applying torque to the fluid pump 14 using the other hand. The rotation of the fluid pump 14 in the loosening direction causes the locking surfaces 70 of the teeth 68 to engage with the ribs 28 on the fluid reservoir 12. Because of the steep slope of the locking surfaces 70, the teeth 68 are unable to slide past the ribs 28 and become stuck.

Figure 8:
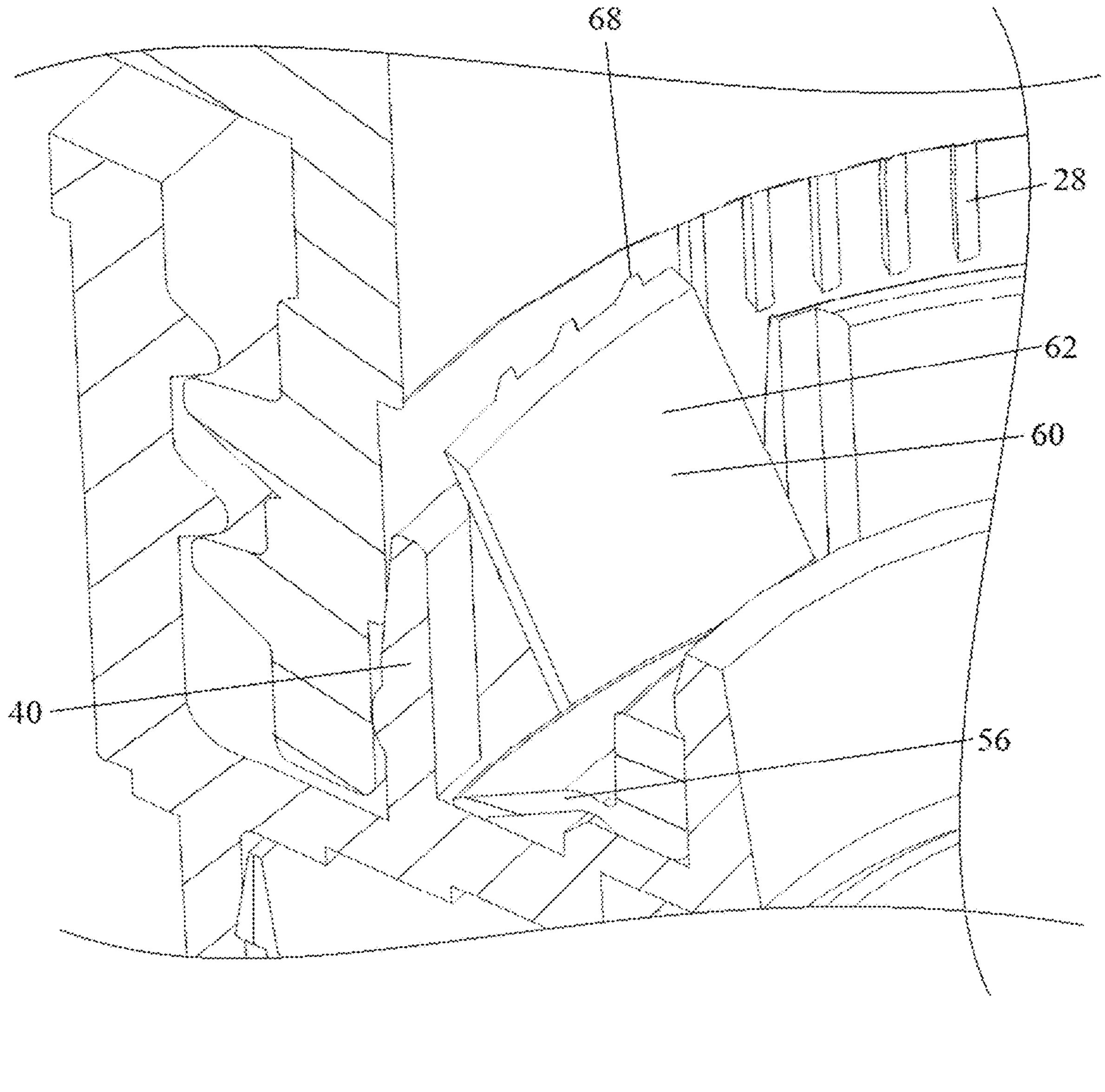
FIG. 8 is a detailed cross-sectional perspective view showing a ruptured frangible element of the fluid dispenser shown in FIG. 1.

While the teeth 68 are stuck against the ribs 28, at least some of the removal force is transmitted from the teeth 68 to the surrounding material of the fluid pump 14. The thin, frangible connecting portions 64 are configured to rupture when a sufficient removal force is applied, as can be seen in FIG. 8. Once at least some of the connecting portions 64 are ruptured, the central tab 62 and the teeth 68 are able to move out of engagement with the ribs 28, and the fluid pump 14 can continue to be rotated in the loosening direction until the fluid pump 14 is separated from the fluid reservoir 12. The fluid pump 14 and the fluid reservoir 12 can then be recycled separately.

The frangible sealing element 60 is preferably configured so as not to become completely separated from the rest of the fluid pump 14 during the removal process. In particular, the sizes and shapes of the central tab 62, the teeth 68, and the ribs 28 are preferably selected so that only a moderate increase in the flexibility of the frangible scaling element 60 is required to allow the teeth 68 to move past the ribs 28 in the loosening direction. This moderate increase in the flexibility of the frangible sealing element 60 can be provided by rupturing only a part of the frangible connecting portions 64, typically the leading edge in the loosening direction. Once the frangible sealing element 60 is sufficiently flexible to slide past the ribs 28, the remaining parts of the frangible connecting portions 64 remain intact. This reduces the number of separate parts that need to be recycled, and helps to ensure that the frangible sealing element 60 is recycled together with the rest of the fluid pump 14. In FIG. 8, the degree of rupturing and deformation of the frangible sealing element 60 is exaggerated in order to more clearly show the operation of the invention. Optionally, the frangible sealing element 60 has a non-frangible connecting portion that is designed to remain intact and connect the frangible sealing element 60 to the rest of the fluid pump 14, even if all of the frangible connecting portions 64 are ruptured.

Advantageously, the fluid pump 14 can thus be separated from the fluid reservoir 12 without any portion of the fluid pump 14 remaining attached to or in contact with the fluid reservoir 12. This allows the fluid pump 14 and the fluid reservoir 12 to be recycled separately, as may be required and/or preferred if the fluid pump 14 and the fluid reservoir 12 are made from different materials. The fluid pump 14 may, for example, have a mixed polyolefin construction, and the fluid reservoir 12 may be made from PET.

The ruptured frangible sealing element 60 also prevents the fluid dispenser 10 from being reused, and thus helps to prevent contamination. In particular, if the fluid reservoir 12 were to be refilled and reattached to the fluid pump 14, the ruptured frangible sealing element 60 would cause the fluid dispenser 10 to be inoperable.

Figure 9:
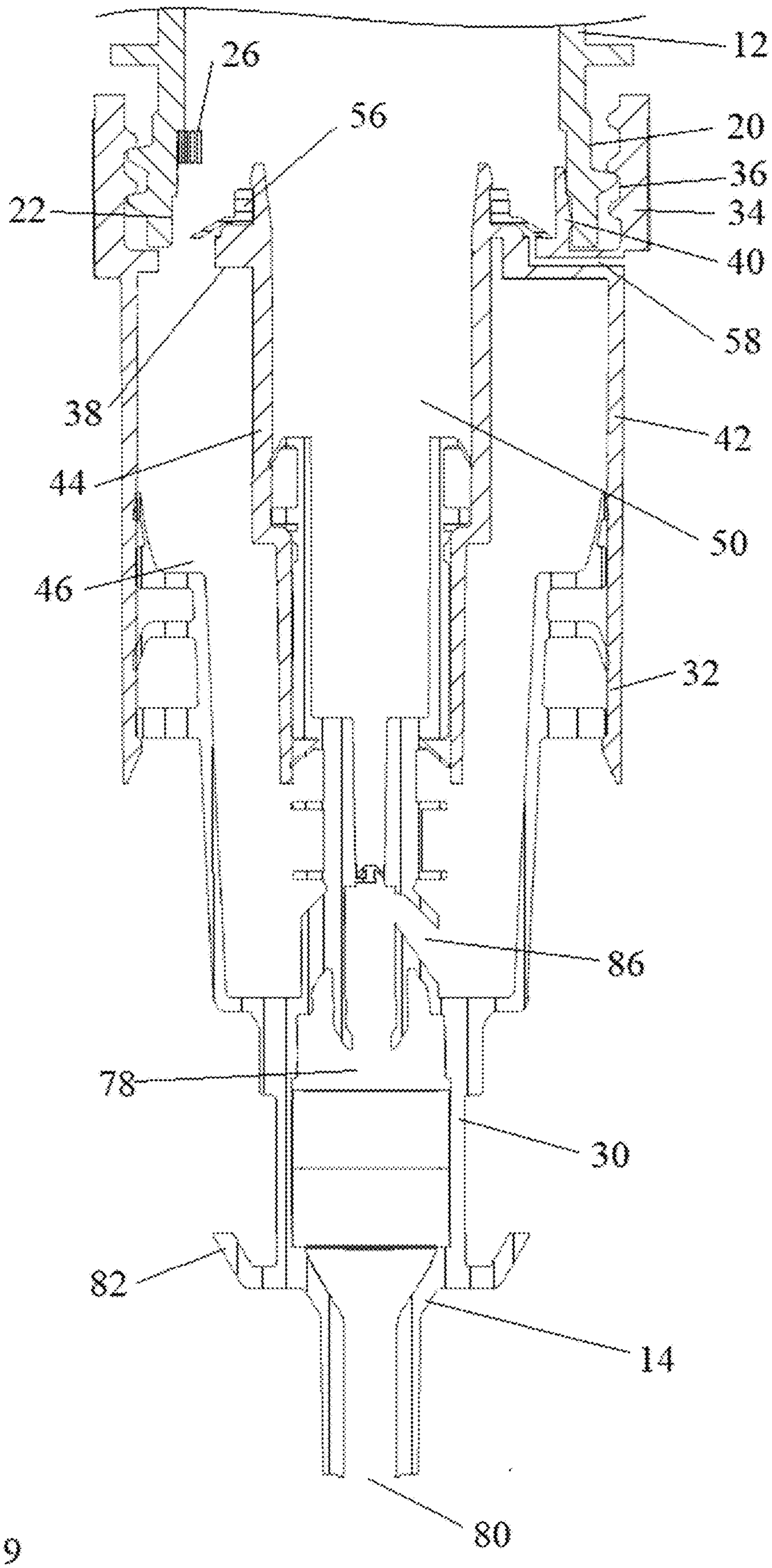
FIG. 9 a cross-sectional front view of the fluid dispenser shown in FIG. 1, with the fluid pump shown in an extended position and with the frangible element omitted.

This is illustrated in FIG. 9, in which the frangible sealing element 60 has been omitted in order to clearly illustrate the effects of rupturing the frangible sealing element 60. In practice, the ruptured frangible sealing element 60 would remain in place, but would not form liquid tight seals with the surrounding surfaces due to the torn connecting portions 64.

As can be seen by comparing FIG. 6 and FIG. 9, without an intact frangible sealing element 60, the first seal 90 and the third seal 94 are broken. This allows the liquid from the fluid reservoir 12 to flow into the air chamber 46, and to leak out of the air vent 58 and the fluid outlet 80. The second seal 92 is also substantially damaged, which may allow fluid to leak out of the fluid reservoir 12 between the threads. In addition, with the air chamber 46 open at the top, the pump 14 is unable to generate foam.

It will be understood that, although various features of the invention have been described with respect to one or another of the embodiments of the invention, the various features and embodiments of the invention may be combined or used in conjunction with other features and embodiments of the invention as described and illustrated herein.

The invention is not limited to the particular structures of the preferred embodiments that have been shown in the drawings. For example, the principles of the invention could be incorporated into any suitable fluid dispenser 10 structure, including one or more of the structures disclosed in U.S. Pat. No. 7,984,825 to Ophardt et al., issued Jul. 26, 2011; U.S. Pat. No. 8,684,236 to Ophardt, issued Apr. 1, 2014; U.S. Pat. No. 5,373,970 to Ophardt, issued Dec. 20, 1994; U.S. Pat. No. 5,836,482 to Ophardt et al., issued Nov. 17, 1998; U.S. Pat. No. 8,113,388 to Ophardt et al., issued Feb. 14, 2012; U.S. Pat. No. 9,682,390 to Ophardt et al., issued Jun. 20, 2017; U.S. Pat. No. 10,242,301 to Ophardt et al., issued Mar. 26, 2019; U.S. Pat. No. 7,303,099 to Ophardt, issued Dec. 4, 2007; U.S. Pat. No. 8,272,539 to Ophardt et al., issued Sep. 25, 2012; U.S. Pat. No. 8,733,596 to Ophardt et al., issued May 27, 2014; U.S. Pat. No. 9,573,152 to Ophardt et al., issued Feb. 21, 2017; and U.S. Pat. No. 10,105,018 to Jones et al., issued Oct. 23, 2018, which are incorporated herein by reference. The fluid dispenser 10 need not be designed to dispense foam, and could instead be used to dispense any desired fluid such as liquid soap or liquid hand sanitizer.

The invention is not limited to the particular structure of the frangible sealing element 60 as shown in the drawings. Rather, any suitable frangible sealing element 60 structure could be used that is configured to rupture when the fluid pump 14 is removed from the fluid reservoir 12, without any portion of the frangible sealing element 60 remaining in contact with the fluid reservoir 12 post-removal. The frangible sealing element 60 could also form or contribute to a different seal or seals from the ones shown in the drawings. Optionally, the frangible sealing element 60 could form part of the fluid reservoir 12 instead of the fluid pump 14. Rupturing the frangible sealing element 60 may cause the fluid pump 14 to become inoperable by allowing the liquid to leak out of the dispenser 10; by allowing the liquid to drain out of a chamber where the liquid is required for operation of the dispenser; by allowing the liquid to flow into a chamber that must remain liquid-free for normal operation; by preventing the dispenser 10 from producing pressure changes required for normal operation; and/or by making any other change or changes that cause the dispenser 10 to lose some or all of its functionality.

In the preferred embodiment, the removal force is described as a twisting motion or torque. In other embodiments of the invention, other directions of force could be used as the removal force, such as a linear force pulling the fluid pump 14 away from the reservoir 12.

The pump engagement feature 66 and the reservoir engagement feature 26 need not have the particular structures shown in the preferred embodiments. There could also be a greater number or a smaller number of teeth 68 and/or ribs 28. For example, a plurality of ribs 28 could be arranged about the entire circumference of the neck portion 18. Preferably, there is at least one portion of the inner surface 22 that is free of ribs 28, where the teeth 68 are positioned when the threaded connection is fully tightened. Optionally, the ribs 28 could have a sloped surface 72 facing in the tightening direction and a locking surface 70 facing in the loosening direction, similarly to the teeth 68.

The pump engagement feature 66 and the reservoir engagement feature 26 could have any suitable structure that prevents removal of the fluid pump 14 unless the frangible sealing element 60 is ruptured.

The fluid dispenser 10 can be used to dispense hand cleaning fluids, such as soap or hand sanitizer. The fluid dispenser 10 could also be used to dispense any other desired fluid, such as shampoo, body wash, or moisturizer. The term "fluid" as used herein is intended to refer broadly to any flowable substance, including liquids, gels, foams, emulsions, and dispersions.

The threaded inner surface 36 is also referred to herein as the threaded pump surface 36; the threaded outer surface 20 is also referred to herein as the threaded reservoir surface 20 or the outer neck surface 20; the neck portion 18 is also referred to herein as the cylindrical neck portion 18; the inner surface 22 is also referred to herein as the inner neck surface 22; the inner reservoir engagement wall 40 is also referred to herein as the cylindrical reservoir engagement wall 40; the slope of the sloped surface 72 is also referred to herein as the first slope; the slope of the locking surface 70 is also referred to herein as the second slope; the central tab 62 is also referred to herein as the supporting portion 62; the frangible connecting portion 64 that forms part of the cylindrical reservoir engagement wall 40 and is located adjacent to the supporting portion 62 in the loosening direction is also referred to herein as the leading edge connecting portion; the frangible connecting portion 64 that forms part of the cylindrical reservoir engagement wall 40 and is located adjacent to the supporting portion 62 in the tightening direction is also referred to herein as the trailing edge connecting portion; the first seal 90 is also referred to herein as the radial seal 90; the second seal 92 is also referred to herein as the axial seal 92; the third seal 94 is also referred to herein as the valve seal 94; the frangible connecting portion 64 that forms part of the transverse annular wall 38 and is located radially outwardly from the cylindrical reservoir engagement wall 40 is also referred to herein as the outer connecting portion; and the frangible connecting portion 64 that forms part of the transverse annular wall 38 and is located radially inwardly from the cylindrical reservoir engagement wall 40 is also referred to herein as the inner connecting portion.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

We claim:

1. A fluid dispenser comprising:

a fluid reservoir containing a supply of a fluid; and a fluid pump that is attached to the fluid reservoir;

wherein the fluid pump is operable on activation to dispense an allotment of the fluid from the fluid reservoir;

wherein the fluid pump comprises a frangible sealing element that forms at least part of at least one fluid tight seal;

wherein the fluid pump further comprises a pump engagement feature, and the fluid reservoir comprises a reservoir engagement feature;

wherein the pump engagement feature is configured to engage with the reservoir engagement feature upon application of a removal force;

wherein, while the pump engagement feature is engaged with the reservoir engagement feature, the frangible sealing element is configured to rupture from the application of the removal force;

wherein the pump engagement feature is configured to disengage from the reservoir engagement feature once the frangible sealing element has ruptured;

wherein the fluid pump is configured to be removable from the fluid reservoir once the frangible sealing element has ruptured and the pump engagement feature has disengaged from the reservoir engagement feature, without any portion of the fluid pump remaining in contact with the fluid reservoir post-removal; and wherein, when the frangible sealing element is ruptured, the fluid pump is unable to form the at least one fluid tight seal, which renders the fluid pump inoperable.

2. The fluid dispenser according to claim 1, wherein the pump engagement feature is supported at least in part by the frangible sealing element; and wherein the frangible sealing element is configured so that, once the frangible sealing element is ruptured, the pump engagement feature has an increased freedom of motion that allows the pump engagement feature to disengage from the reservoir engagement feature.

3. The fluid dispenser according to claim 1, wherein the frangible sealing element is configured to remain connected to at least one component of the fluid pump after the frangible sealing element is ruptured.

4. The fluid dispenser according to claim 1, wherein the fluid reservoir has a threaded reservoir surface;

wherein the fluid pump has a threaded pump surface;

wherein, when the fluid pump is attached to the fluid reservoir, the threaded reservoir surface is threadedly engaged with the threaded pump surface; and wherein the fluid pump is configured to be removable from the fluid reservoir by applying the removal force as torque rotating the fluid pump in a loosening direction relative to the fluid reservoir.

5. The fluid dispenser according to claim 4, wherein the fluid reservoir has a cylindrical neck portion with an inner neck surface and an outer neck surface;

wherein the outer neck surface comprises the threaded reservoir surface;

wherein the inner neck surface supports the reservoir engagement feature;

wherein the fluid pump has a cylindrical reservoir engagement wall; and wherein the cylindrical reservoir engagement wall supports the pump engagement feature.

6. The fluid dispenser according to claim 5, wherein the reservoir engagement feature comprises at least one rib that extends radially inwardly from the inner neck surface; and wherein the pump engagement feature comprises at least one tooth that extends radially outwardly from the cylindrical reservoir engagement wall.

7. The fluid dispenser according to claim 6, wherein the at least one tooth has a locking surface that faces in the loosening direction and a sloped surface that faces in a tightening direction;

wherein the sloped surface extends laterally outwardly from the cylindrical reservoir engagement wall at a first slope that is selected so that, when the fluid pump is rotated in the tightening direction relative to the fluid reservoir, the at least one rib is able to slide over the sloped surface and move past the at least one tooth without locking in engagement with the at least one tooth; and wherein the locking surface extends laterally outwardly from the cylindrical reservoir engagement wall at a second slope that is selected so that, when the fluid pump is rotated in the loosening direction relative to the fluid reservoir, the at least one rib is unable to slide over the locking surface and becomes locked in engagement with the at least one tooth until the frangible sealing element is ruptured.

8. The fluid dispenser according to claim 5, wherein a portion of the cylindrical reservoir engagement wall is formed by the frangible sealing element;

wherein the frangible sealing element comprises a supporting portion and at least one frangible connecting portion;

wherein the supporting portion supports the pump engagement feature; and wherein the at least one frangible connecting portion has a reduced wall thickness that is selected so that at least part of the at least one frangible connecting portion will rupture under the removal force.

9. The fluid dispenser according to claim 8, wherein the supporting portion is configured to be moveable laterally inwardly away from the reservoir engagement feature once the frangible sealing element has ruptured.

10. The fluid dispenser according to claim 8, wherein the cylindrical reservoir engagement wall has a sealing portion and a locking portion;

wherein the locking portion of the cylindrical reservoir engagement wall is formed by the supporting portion of the frangible sealing element;

wherein the pump engagement feature is located on the locking portion; and wherein the reservoir engagement feature is positioned so that, when the fluid pump is connected to the fluid reservoir, the reservoir engagement feature is spaced from the sealing portion.

11. The fluid dispenser according to claim 8, wherein the at least one frangible connecting portion comprises a leading edge connecting portion that forms part of the cylindrical reservoir engagement wall and is located adjacent to the supporting portion in the loosening direction.

12. The fluid dispenser according to claim 8, wherein the at least one frangible connecting portion comprises a trailing edge connecting portion that forms part of the cylindrical reservoir engagement wall and is located adjacent to the supporting portion in a tightening direction.

13. The fluid dispenser according to claim 8, wherein the at least one fluid tight seal comprises a radial seal that is formed between the inner neck surface of the cylindrical neck portion and the cylindrical reservoir engagement wall.

14. The fluid dispenser according to claim 8, wherein the fluid pump has a transverse annular wall that extends radially inwardly from the threaded pump surface;

wherein the cylindrical reservoir engagement wall extends from the transverse annular wall; and wherein part of the transverse annular wall is formed by the frangible sealing element.

15. The fluid dispenser according to claim 14, wherein, when the fluid pump is connected to the fluid reservoir, the cylindrical neck portion of the fluid reservoir engages with the transverse annular wall; and wherein the at least one fluid tight seal comprises an axial seal that is formed between the cylindrical neck portion and the transverse annular wall.

16. The fluid dispenser according to claim 14, wherein the fluid pump further comprises:

an air vent that extends through the transverse annular wall; and an air valve that engages with the transverse annular wall to regulate air flow through the air vent;

wherein the at least one fluid tight seal comprises a valve seal that is formed between the air valve and the transverse annular wall.

17. The fluid dispenser according to claim 14, wherein the at least one frangible connecting portion comprises an outer connecting portion that forms part of the transverse annular wall and is located radially outwardly from the cylindrical reservoir engagement wall; and wherein the at least one frangible connecting portion comprises an inner connecting portion that forms part of the transverse annular wall and is located radially inwardly from the cylindrical reservoir engagement wall.

18. The fluid dispenser according to claim 7, wherein the pump engagement feature is supported at least in part by the frangible sealing element;

wherein the frangible sealing element is configured so that, once the frangible sealing element is ruptured, the pump engagement feature has an increased freedom of motion that allows the pump engagement feature to disengage from the reservoir engagement feature; and wherein the frangible sealing element is configured to remain connected to at least one component of the fluid pump after the frangible sealing element is ruptured.

19. The fluid dispenser according to claim 18, wherein a portion of the cylindrical reservoir engagement wall is formed by the frangible sealing element;

wherein the frangible sealing element comprises a supporting portion and at least one frangible connecting portion;

wherein the supporting portion supports the pump engagement feature;

wherein the at least one frangible connecting portion has a reduced wall thickness that is selected so that at least part of the at least one frangible connecting portion will rupture under the removal force;

wherein the supporting portion is configured to be moveable laterally inwardly away from the reservoir engagement feature once the frangible sealing element has ruptured;

wherein the cylindrical reservoir engagement wall has a sealing portion and a locking portion;

wherein the locking portion of the cylindrical reservoir engagement wall is formed by the supporting portion of the frangible sealing element;

wherein the pump engagement feature is located on the locking portion; and wherein the reservoir engagement feature is positioned so that, when the fluid pump is connected to the fluid reservoir, the reservoir engagement feature is spaced from the sealing portion.

20. The fluid dispenser according to claim 19, wherein the at least one frangible connecting portion comprises a leading edge connecting portion that forms part of the cylindrical reservoir engagement wall and is located adjacent to the supporting portion in the loosening direction;

wherein the at least one frangible connecting portion comprises a trailing edge connecting portion that forms part of the cylindrical reservoir engagement wall and is located adjacent to the supporting portion in the tightening direction;

wherein the at least one fluid tight seal comprises a radial seal that is formed between the inner neck surface of the cylindrical neck portion and the cylindrical reservoir engagement wall;

wherein the fluid pump has a transverse annular wall that extends radially inwardly from the threaded pump surface;

wherein the cylindrical reservoir engagement wall extends from the transverse annular wall;

wherein part of the transverse annular wall is formed by the frangible sealing element;

wherein, when the fluid pump is connected to the fluid reservoir, the cylindrical neck portion of the fluid reservoir engages with the transverse annular wall;

wherein the at least one fluid tight seal comprises an axial seal that is formed between the cylindrical neck portion and the transverse annular wall;

wherein the fluid pump further comprises:

an air vent that extends through the transverse annular wall; and an air valve that engages with the transverse annular wall to regulate air flow through the air vent;

wherein the at least one fluid tight seal comprises a valve seal that is formed between the air valve and the transverse annular wall;

wherein the at least one frangible connecting portion comprises an outer connecting portion that forms part of the transverse annular wall and is located radially outwardly from the cylindrical reservoir engagement wall; and wherein the at least one frangible connecting portion comprises an inner connecting portion that forms part of the transverse annular wall and is located radially inwardly from the cylindrical reservoir engagement wall.

* * * * *